United States Patent
Lin et al.

(10) Patent No.: US 10,295,301 B2
(45) Date of Patent: May 21, 2019

(54) DIFFERENTIAL PRESSURE TYPE INFLATING DEVICE

(71) Applicants: Yu-Wen Lin, Chiayi County (TW); Wei-Jen Huang, Yunlin County (TW); Tire Service Equipment Mfg., Inc., Phoenix, AZ (US)

(72) Inventors: Yu-Wen Lin, Chiayi County (TW); Wei-Jen Huang, Yunlin County (TW)

(73) Assignees: Yu-Wen Lin, Chiayi County (TW); Wei-Jen Huang, Yunlin County (TW); Tire Service Equipment Mfg, Inc., Phoneix, AZ (US)

( * ) Notice: Subject to any disclaimer, the term of this patent is extended or adjusted under 35 U.S.C. 154(b) by 0 days.

(21) Appl. No.: 15/384,295

(22) Filed: Dec. 19, 2016

(65) Prior Publication Data
US 2018/0128390 A1    May 10, 2018

(30) Foreign Application Priority Data
Oct. 31, 2016   (TW) .............................. 105216585 U

(51) Int. Cl.
| F16K 15/20 | (2006.01) |
| F41B 11/60 | (2013.01) |
| F16K 31/363 | (2006.01) |
| F41B 11/72 | (2013.01) |
| F16K 15/18 | (2006.01) |
| F16K 15/02 | (2006.01) |
| F16K 31/122 | (2006.01) |

(52) U.S. Cl.
CPC ............ *F41B 11/60* (2013.01); *F16K 15/021* (2013.01); *F16K 15/026* (2013.01); *F16K 15/18* (2013.01); *F16K 15/20* (2013.01); *F16K 15/207* (2013.01); *F16K 31/1221* (2013.01); *F16K 31/363* (2013.01); *F41B 11/72* (2013.01); *Y10T 137/3584* (2015.04)

(58) Field of Classification Search
CPC .... F16K 15/20; F16K 31/1221; F16K 31/363; F41B 11/60; F41B 11/72; Y10T 137/3584
See application file for complete search history.

(56) References Cited

U.S. PATENT DOCUMENTS

| 4,197,966 | A | * | 4/1980 | Wadensten | ........... B65D 88/703 |
| | | | | | 222/1 |
| 6,726,059 | B2 | * | 4/2004 | Treat | .................... B65D 88/703 |
| | | | | | 137/493.1 |

(Continued)

*Primary Examiner* — Atif H Chaudry
(74) *Attorney, Agent, or Firm* — Raymond Y. Chan; David and Raymond Patent Firm

(57) ABSTRACT

A differential pressure type inflating device, adapted for fast inflating the devices that need inflating, comprises a gas container, a relief valve, a gas nozzle, a pipe joint, a switch valve, and a relief pipe. When external high pressure gas enters the gas container and renders the gas pressures in the gas container and the relief pipe reaching a balance condition, the switch valve can be pressed to generate pressure drop in the relief pipe, which launches the relief valve and discharges the high pressure gas in the gas container from the gas nozzle. In this design, the gas container, relief valve, gas nozzle, relief pipe, and pipe joint are connected with screwing structures, so as to achieve the function of easy assembling.

7 Claims, 7 Drawing Sheets

(56) References Cited

U.S. PATENT DOCUMENTS

| | | | | |
|---|---|---|---|---|
| 6,820,638 B1* | 11/2004 | Gosinski | ............... | F16L 41/03 137/343 |
| 2011/0253317 A1* | 10/2011 | Kunau | ............... | B60C 25/145 157/1.1 |

* cited by examiner

DIFFERENTIAL PRESSURE TYPE INFLATING DEVICE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a differential pressure type inflating device, and more particularly to an inflating device that utilizes internal pressure differences to rapidly discharge high pressure gas for fast inflating tires.

Description of Related Arts

Both Taiwan Patent No. M477504, entitled "Differential Pressure Type Quick Pressurization Device" and U.S. Pat. No. 6,179,033B1 disclosed fast pressurization devices that can fast pressurize tires. The "Differential Pressure Type Quick Pressurization Device," for example, mainly respectively installs a fast releasing valve and a decompression control valve on a gas container and uses a pipeline to connect them. The fast releasing valve is also externally connected with a gas input pipe. When the decompression control valve is actuated, the high pressure gas in the pipeline will be released instantly, which causes the high pressure gas in the gas container to discharge to the outside via the fast releasing valve and the gas input pipe to fast fill or inflate tires. Nonetheless, the connections between the fast releasing valve and the gas container, the gas input pipe and the fast releasing valve, the fast releasing valve and the pipeline, and the pipeline and the decompression control valve are finished by welding. Because of the orders of assembling of these elements, the welding process will have to be done in a very limited space, which causes the welding and assembling among these elements difficult. Hence, the prior art of "Differential Pressure Type Quick Pressurization Device" has a drawback of difficult assembling.

SUMMARY OF THE PRESENT INVENTION

A main object of the present invention is to provide a differential pressure type inflating device that can be assembled easily.

Accordingly, the differential pressure type inflating device according to the present invention for fast inflating the devices that need inflating comprises a gas container, a relief valve, a gas nozzle, a pipe joint, a switch valve, and a relief pipe. The gas container, adapted for storing high pressure gas from outside, comprises a container body and a connecting ring and a locking ring respectively formed on a front end and an upper portion of the container body. An inner edge of the connecting ring has a screwing portion formed thereon. An inner edge of the locking ring also has an internal threaded portion formed thereon. The relief valve comprises a valve body, a piston unit arranged in the valve body, and a resilient member connected between the valve body and the piston unit. The valve body has a plurality of vent holes formed thereon, an inner locking portion and an outer locking portion formed on one end thereof, and a screw locking portion formed on another end thereof. The outer locking portion is screwed to the screwing portion of the connecting ring. The piston unit is pushed by the resilient member to sealingly close the vent holes. The gas nozzle comprises a pipe unit screwed to the inner locking portion of the relief valve and a pipe head extended from the pipe unit. The pipe joint is screwed to the internal threaded portion of the locking ring, providing an upper inner screw portion and a lower inner screw portion. The switch valve is screwed to the upper inner screw portion of the pipe joint. The relief pipe is arranged between the relief valve and the pipe joint. Two ends of the relief pipe have a first screwing end and a second screwing end formed thereon respectively. The first screwing end is screwed to the screw locking portion of the relief valve. The second screwing end is screwingly arranged on the lower inner screw portion of the pipe joint. When external high pressure gas enters the gas container and renders the gas pressures in the gas container and the relief pipe reaching a balance condition, the switch valve is able to be pressed to generate a pressure drop in the relief pipe that triggers the relief valve to actuate and discharge high pressure gas in the gas container through the gas nozzle.

In this design, the inflating device has the gas container, relief valve, gas nozzle, relief pipe, and pipe joint to be interconnected with screwing structures, which actually achieves the function of easy assembling.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
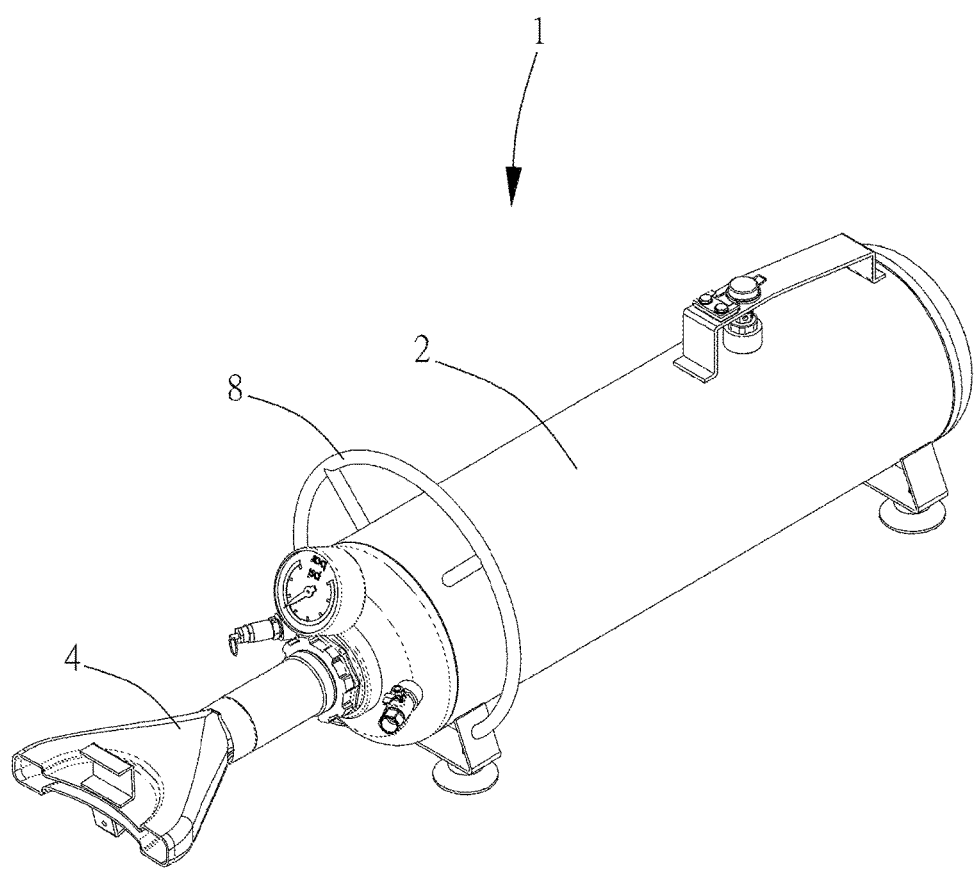
FIG. 1 is a perspective view of the differential pressure type inflating device according to a preferred embodiment of the present invention.
Figure 2:
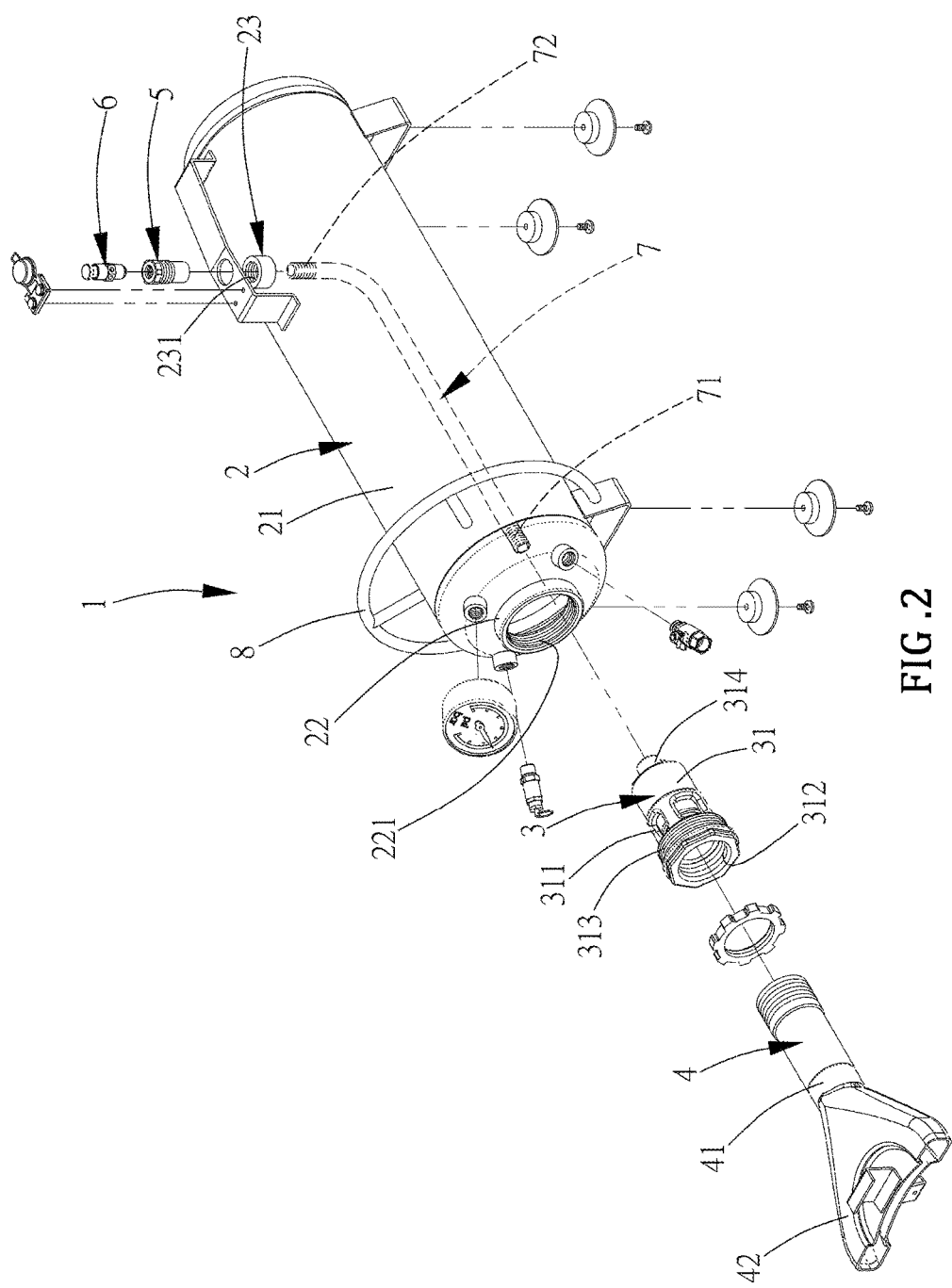
FIG. 2 is a partial exploded view of the differential pressure type inflating device according to the above preferred embodiment of the present invention.
Figure 3:
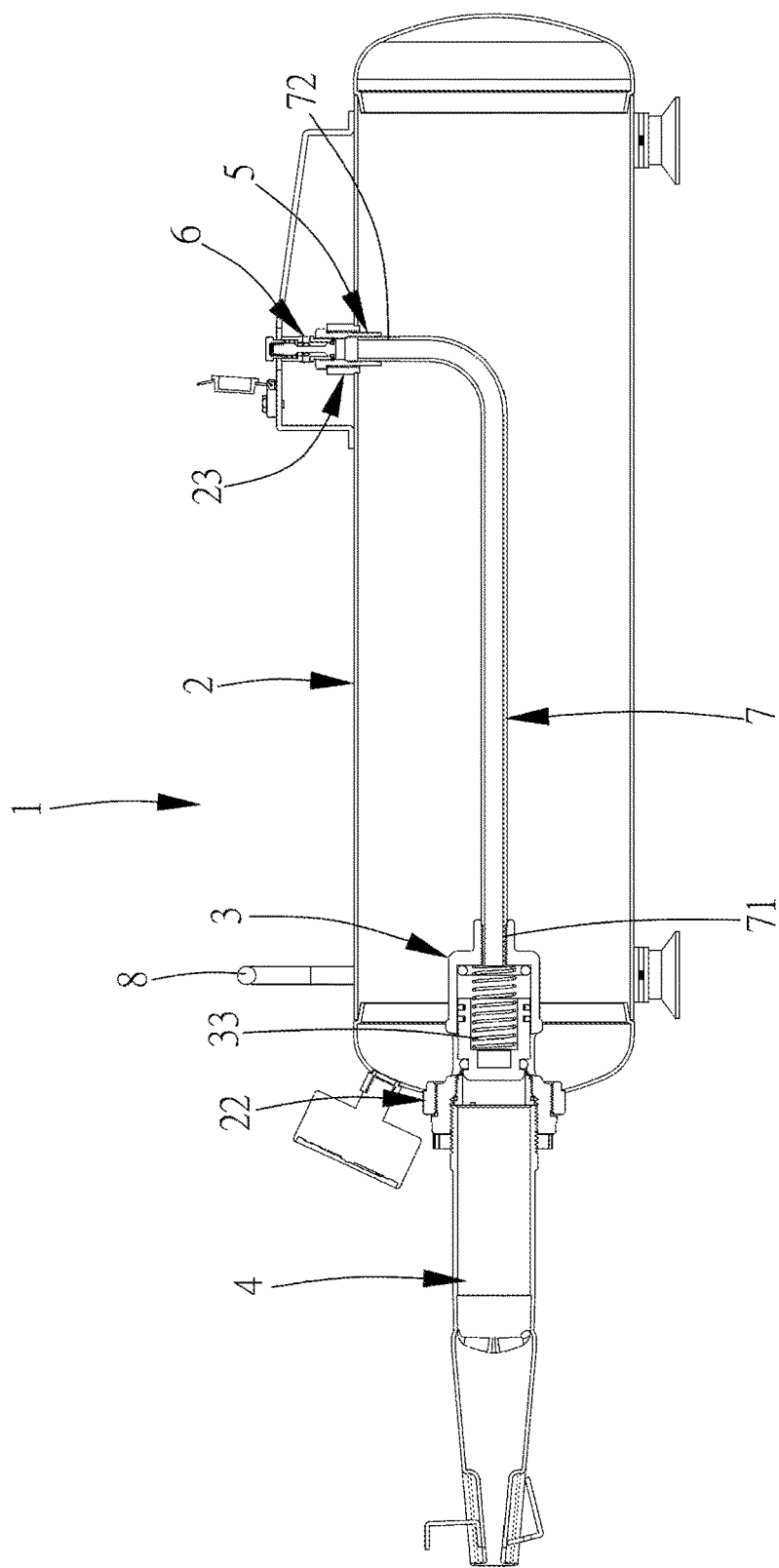
FIG. 3 is a sectional view of the differential pressure type inflating device according to the above preferred embodiment of the present invention.
Figure 4:
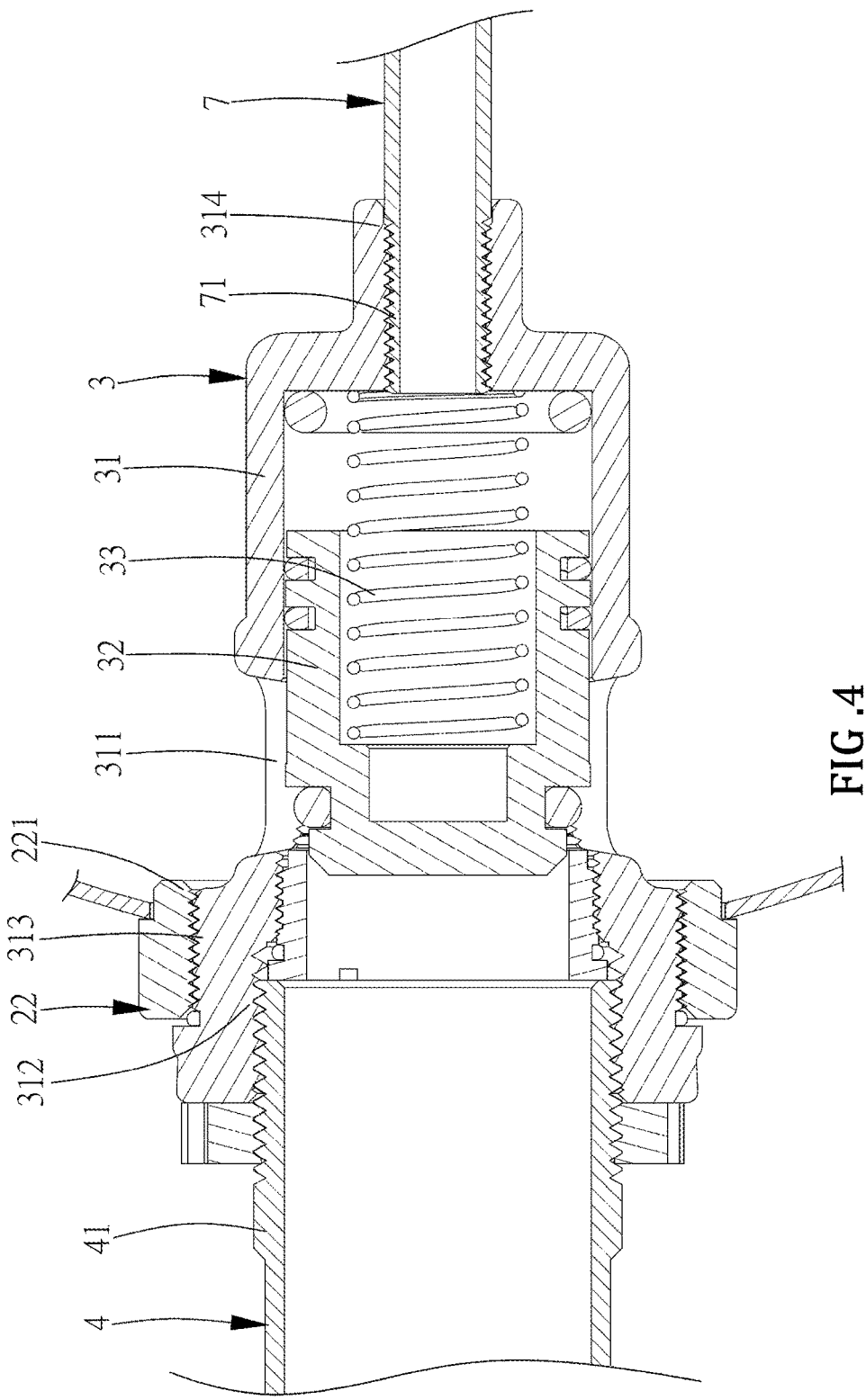
FIG. 4 is a sectional and enlarged view of the connection of part of the elements of the differential pressure type inflating device according to the above preferred embodiment of the present invention.
Figure 5:
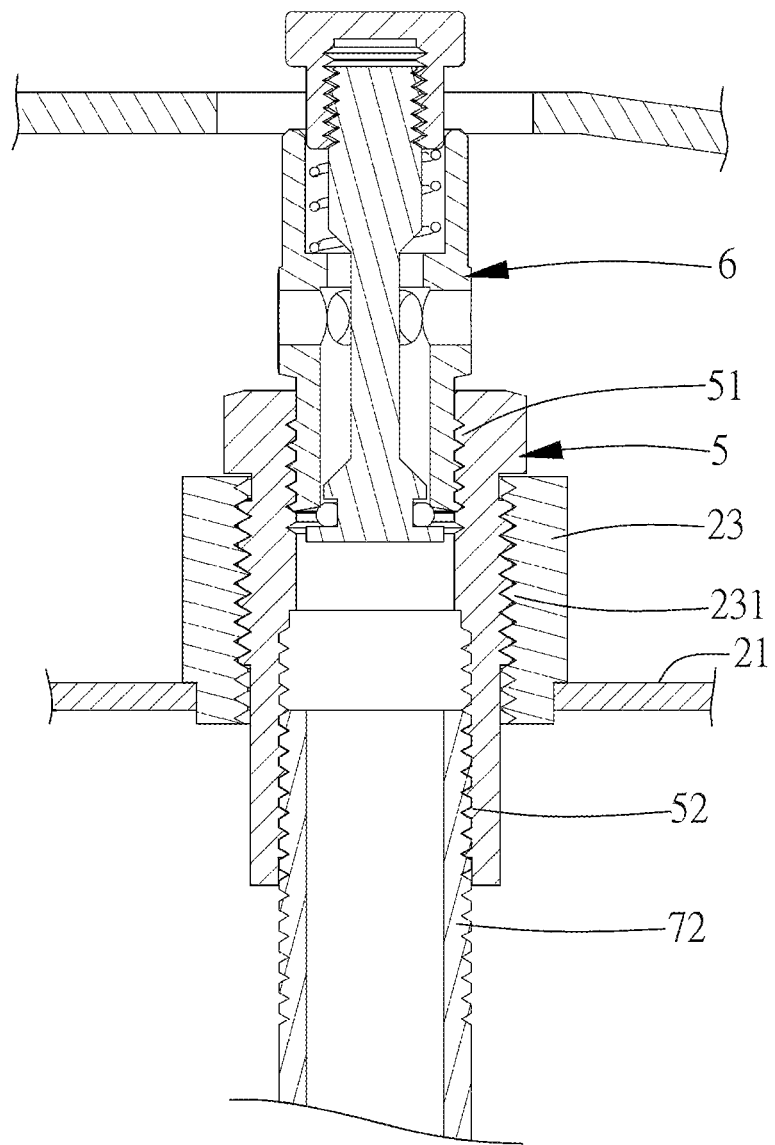
FIG. 5 is a sectional and enlarged view of the connection of another part of the elements of the differential pressure type inflating device according to the above preferred embodiment of the present invention.

Referring to FIGS. 1-5, the differential pressure type inflating device according to a preferred embodiment of the present invention can store high pressure gas generated by external pneumatic source and conduct fast inflating to devices that needs inflation or gas charging, such as tires. The differential pressure type inflating device comprises a gas container 2, a relief valve 3, a gas nozzle 4, a pipe joint 5, a switch valve 6, a relief pipe 7, and a ring handle 8.

The gas container 2 is adapted for storing high pressure gas from outside. It comprises a container body 21 and a connecting ring 22 and a locking ring 23 respectively formed on a front end and an upper portion of the container body 21. The inner edge of the connecting ring 22 has a screwing portion 221 formed thereon. The inner edge of the locking ring 23 also has an internal threaded portion 231. Besides, based on the safety concerns and in order to adapt for external pneumatic source, the container body 21 also has an air cock, piezometer, and decompression valve. However, because these are not the features of the present invention, the details thereof are skipped.

The relief valve 3 comprises a valve body 31, a piston unit 32 arranged in the inside of the valve body 31, and a resilient member 33 connected between the valve body 31 and the piston unit 32. The valve body 31 is hollow, so as to accommodate the piston unit 32 and the resilient member 33. The middle of the valve body 31 also has a plurality of vent holes 311 spacingly formed thereon. An inner locking portion 312 and an outer locking portion 313 are formed on one end of the valve body 31, while a screw locking portion 314 is formed on another end of the valve body 31. The outer locking portion 313 is screwed to the screwing portion 221 of the connecting ring 22. The piston unit 32 is pushed by the resilient member 33 in a normal state to sealingly close the vent holes 311. When pressure difference occurs between the inside and outside of the relief valve 3, the piston unit 32 stops closing the vent holes 311.

The gas nozzle 4 comprises a pipe unit 41 screwed to the inner locking portion 312 of the relief valve 3 and a pipe head 42 extended from the pipe unit 41. The pipe head 42 can be made into various forms based on the needs. The pipe unit 41 and the relief valve 3 are mutually screwingly connected, which facilitates the assembling.

The pipe joint 5 is screwed to the internal threaded portion 231 of the locking ring 23, providing an upper inner screw portion 51 and a lower inner screw portion 52.

The switch valve 6 is screwed to the upper inner screw portion 51 of the pipe joint 5. Under the normal state, the switch valve 6 is in a close state.

The relief pipe 7 is arranged between the relief valve 3 and the pipe joint 5. Two ends of the relief pipe 7 have a first screwing end 71 and a second screwing end 72 formed thereon respectively. The first screwing end 71 is screwingly mounted on the screw locking portion 314 of the relief valve 3, while the second screwing end 72 is screwed to the lower inner screw portion 52 of the pipe joint 5.

The ring handle 8 is affixed on the outside of the front end of the container body 21 for holding, which facilitates the operating and moving of the inflating device 1.

The assembling of the elements according to the present invention includes the followings. First, the relief pipe 7 is put into the container body 21 through the connecting ring 22 of the gas container 2. Then, the pipe joint 5 is screwingly connected on the internal threaded portion 231 of the locking ring 23 and the lower inner screw portion 52 is screwingly connected with the second screwing end 72 of the relief pipe 7 as well. Next, the screw locking portion 314 of the relief valve 3 and the first screwing end 71 of the relief pipe 7 are correspondingly screwingly connected with each other. The outer locking portion 313 also screwingly mounted on the screwing portion 221 of the connecting ring 22. Lastly, the pipe unit 41 of the gas nozzle 4 and the inner locking portion 312 are screwingly connected and the switch valve 6 is screwed to the upper inner screw portion 51 of the pipe joint 5 to complete the assembling of the inflating device 1. In order to reinforce the leakproofness among the elements, sticky glue or gum can be respectively applied on the screwing junctions.

Figure 6:
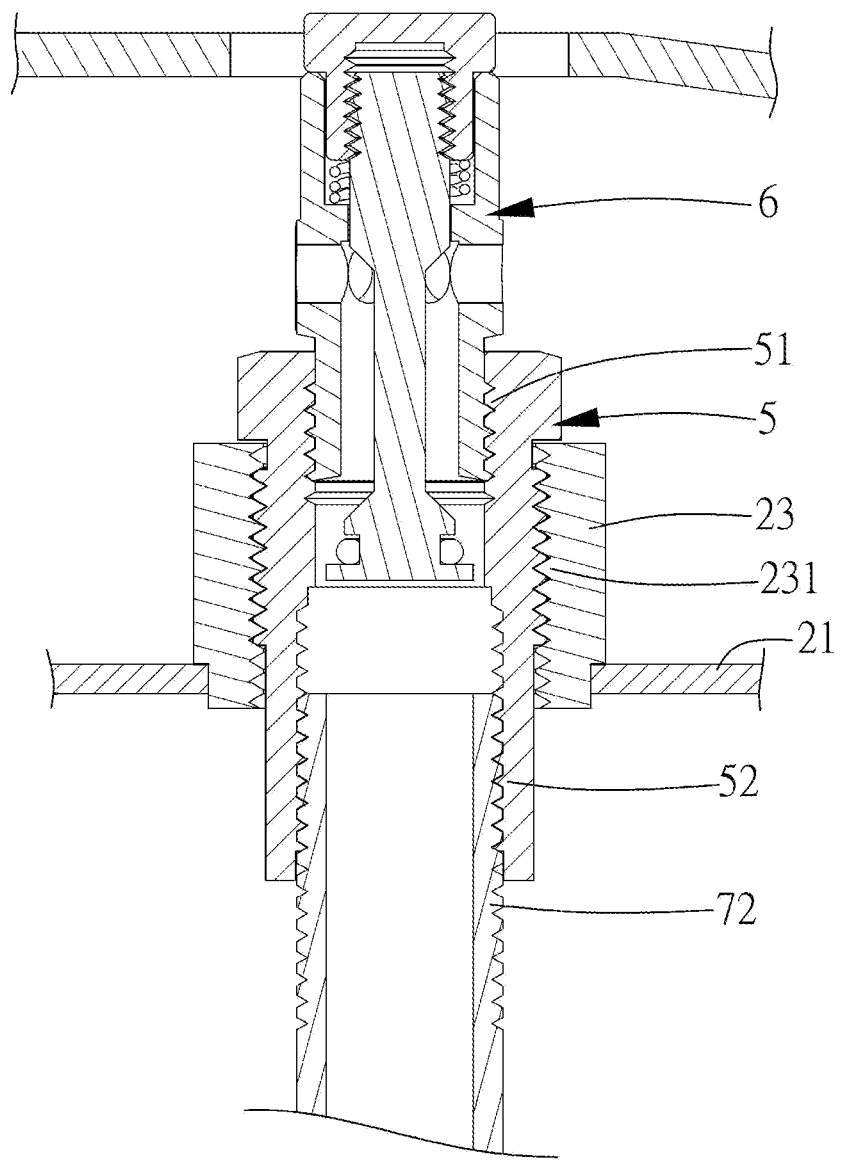
FIG. 6 is a perspective view of the differential pressure type inflating device according to the above preferred embodiment of the present invention illustrating the action of the switch valve.
Figure 7:
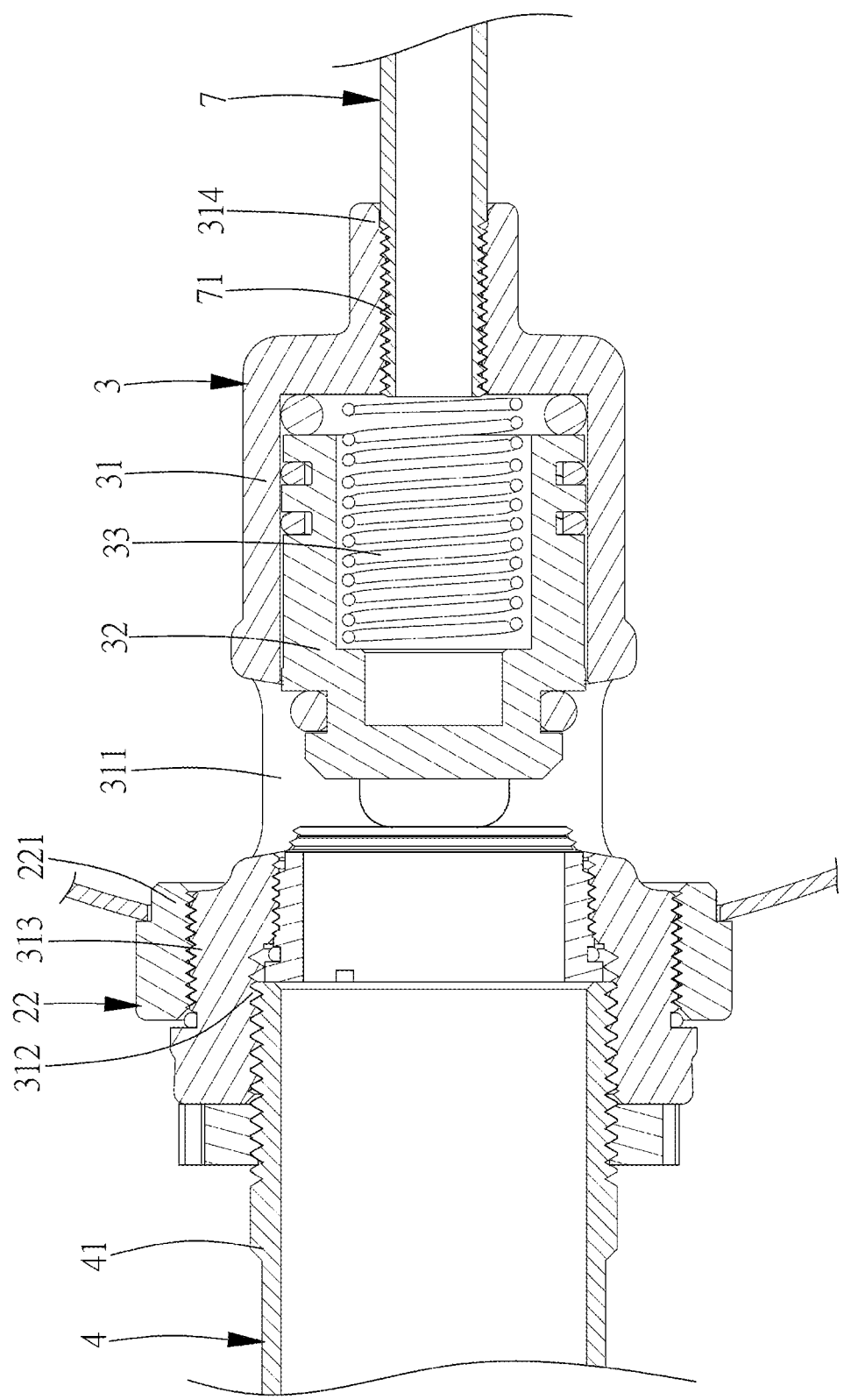
FIG. 7 is a perspective view of the differential pressure type inflating device according to the above preferred embodiment of the present invention illustrating the action of the relief valve.

When external high pressure gas enters the gas container 2 via the air cock of the gas container 2, besides filling the inside of the container body 21, the high pressure gas also enters the relief pipe 7 via the middle of the piston unit 32 and the valve body 31 of the relief valve 3 and eventually reaches pressure balance. Referring to FIG. 6, when pressing switch valve 6, the gas pressure in the relief pipe 7 will be released instantly via the switch valve 6 to outside, which causes the inner pressure of the relief pipe 7 lower than the gas pressure of the gas container 2. The high pressure gas in the gas container 2 will then push the piston unit 32 to compress the resilient member 33 as FIG. 7 illustrated, so as to make the high pressure gas in the gas container 2 to discharge to the outside from the vent hole 311 via the gas nozzle 4 for tire inflation.

The design of the present invention has the gas container 2, relief valve 3, gas nozzle 4, relief pipe 7, and pipe joint 5 to be interconnected with screwing structures, which actually achieves the function of easy assembling contrasting to the welding connections among the elements of the prior art.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A differential pressure type inflating device, comprising:
   a gas container which comprises a container body for storing high pressure gas and a relief pipe supported in said container body, wherein said relief pipe has a first screwing end and a second screwing end;
   a pipe joint coupled at said second screwing end of said relief pipe;
   a switch valve coupled at said pipe joint and externally located on said container body;
   a relief valve which comprises:
   a valve body coupled at a front end of said container body, wherein said valve body has a plurality of vent holes formed therein;
   a piston unit arranged in said valve body for filling the high pressure gas into said relief pipe when the high pressure gas is filled into said container body until a gas pressure within said relief pipe balances with a gas pressure within said container body, wherein the high pressure gas within said relief pipe is released via said switch valve when said switch valve is pressed; and
   a resilient member connected between said valve body and said piston unit to push said piton unit being sealed at said vent holes; and a gas nozzle, comprising a pipe unit screwed to said relief valve and a pipe head extended from said pipe unit, wherein when said switch valve is pressed to instantly release a gas pressure within said relief pipe so as to lower the gas pressure within said relief valve than the gas pressure within said container body, such that said piston unit is pushed to compress said resilient member by the gas pressure within said container body to unseal said vent holes for discharging the high pressure gas in said container body from said vent holes through said gas nozzle.

2. The differential pressure type inflating device, as recited in claim 1, wherein said gas container further comprises a connecting ring formed on said front end of said container body to connect with said valve body, and a locking ring formed at a back end of said container body to connect with said pipe joint.

3. The differential pressure type inflating device, as recited in claim 2, wherein one end of said valve body defines an inner locking portion and an outer locking portion, wherein said inner locking portion and said outer locking portion are coupled with each other, and another end of said valve body defines a screw locking portion, wherein said outer locking portion of said valve body is screwed with a screwing portion of said connecting ring.

4. The differential pressure type inflating device, as recited in claim 3, wherein said pipe joint has an upper inner screw portion screwed to said switch valve and a lower inner screw portion screwed to said second screwing end of said relief pipe.

5. The differential pressure type inflating device, as recited in claim 1, wherein said pipe joint has an upper inner screw portion screwed to said switch valve and a lower inner screw portion screwed to said second screwing end of said relief pipe.

6. The differential pressure type inflating device, as recited in claim 1, further comprising a ring handle mounted on an exterior of said front end of said container body.

7. The differential pressure type inflating device, as recited in claim 1, further comprising a ring handle mounted on an exterior of said front end of said container body.

* * * * *